Figure 6:
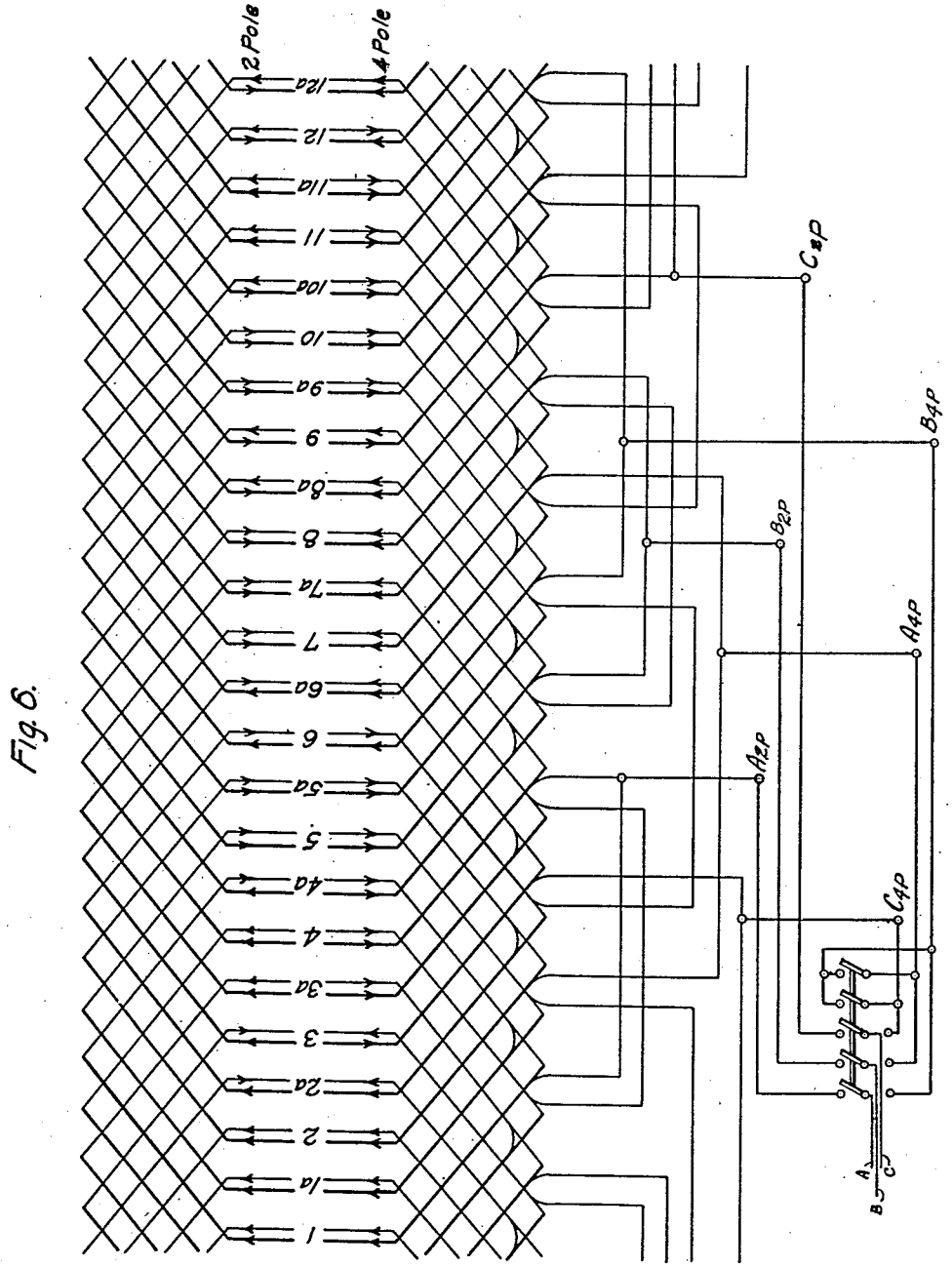

Oct. 8, 1940.  H. TRASSL  2,217,460
VARIABLE POLE-NUMBER THREE-PHASE MOTOR WINDING
Filed Aug. 26, 1937  2 Sheets-Sheet 1
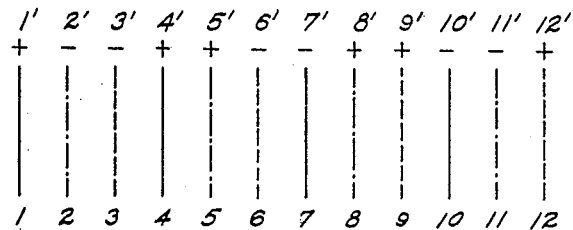
Fig. 1.  2 Poles
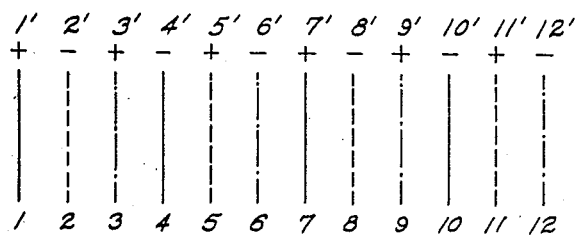
Fig. 2.  4 Poles
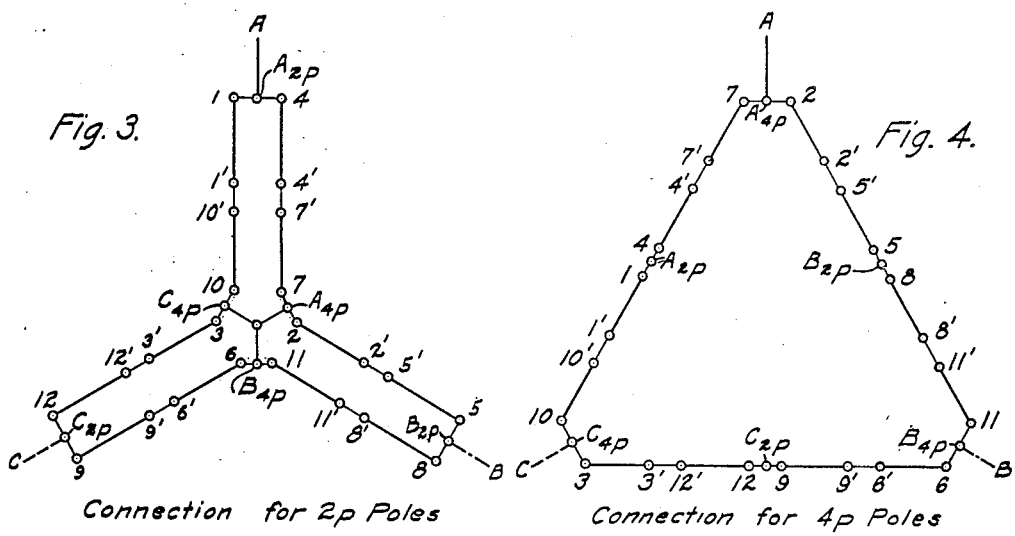
Connection for 2p Poles  Connection for 4p Poles
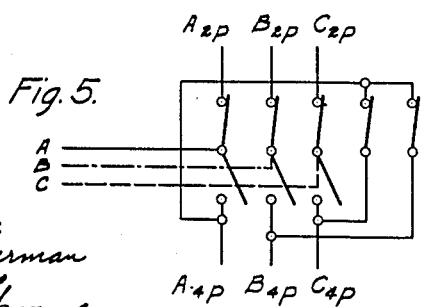
Fig. 5.
WITNESSES:
INVENTOR
Hans Trassl.
BY
ATTORNEY Patented Oct. 8, 1940

2,217,460

UNITED STATES PATENT OFFICE 2,217,460

VARIABLE POLE-NUMBER THREE-PHASE MOTOR WINDING

Hans Trassl, Berlin-Siemensstadt, Germany, assignor to Westinghouse Electric & Manufacturing Company, East Pittsburgh, Pa., a corporation of Pennsylvania Application August 26, 1937, Serial No. 160,946
In Germany September 2, 1936

2 Claims. (Cl. 172—280)

My invention relates to windings for three-phase motors, designed so that the number of poles of the winding may be changed from $2p$ poles to $4p$ poles.

The most satisfactory method of connections for such a winding is to connect the winding in double star for the smaller pole-number, and in straight series delta for the larger pole-number, as this connection requires only 6 leads, as against a very much larger number of leads which are required when other connection-methods are utilized. The usual manner of connecting such windings is to have the coils which make up each group of coils per pole per phase all together in a compact unit, in adjacent slots, for the smaller pole-number. Thus, in a three-phase winding having 6 slots per pole, at the smaller pole-number, there would be two coils per phase per pole, and these two coils would lie in adjacent slots, for the smaller pole-number, so that the induced voltages in the coils would be 30° out-of-phase, resulting in a distribution-factor equal to cos 15° or .966. For the larger pole-number, there would be only one coil per phase per pole, and the distribution factor would be unity.

With this form of connection, which is well known, there would be practically only one factor available to the designer, to be altered in an effort to control the relative powers, running torques, starting torques and pull-out torques of the motor at the two different speeds, said factor being the chording factor, which is of course different at each of the two different pole-numbers.

According to my invention, I have devised a new double pole-number winding of the type changing from a $2p$ pole connection to a $4p$ pole connection by changing from a double star to a delta connection. In accordance with my invention, I divide the coils per phase per pole, for the smaller pole-number, into two groups which, instead of lying in adjacent slots, as formerly, are displaced 90 electrical degrees with respect to each other, the two half-groups being connected in series, so that the distribution-factor, instead of being .966, becomes equal to cos 45°, or .707. This still leaves the designer free to vary the chording factor within reasonable limits, and it frequently makes it possible to work out the design with a much more satisfactory chording factor, or amount of chording, particularly in motors which are required to have the same torque, at both speeds, meaning twice as much power at the higher speed as compared with the output at the lower speed.

With the foregoing and other objects in view, my invention consists in the windings, structures and methods hereinafter described and claimed, and illustrated in the accompanying drawings, wherein:

Figure 1 is a diagrammatic development or layout which I find useful in determining the distribution-factor of a 2-pole-number motor-winding of my invention, showing the three phases and the relative directions of current-flow in the top conductors, for the smaller pole-number, in a motor having 12 slots per pair of poles, Fig. 2 is a similar view for the higher pole-number connection, Fig. 3 is a diagrammatic view showing the double star connection for $2p$ poles, Fig. 4 is a diagrammatic view showing the delta connection for $4p$ poles, Fig. 5 is a view showing the changeover switch; and, Fig. 6 is a development of a complete motor winding embodying my invention in a motor having 24 slots per pair of poles at the smaller pole-number.

In Figs. 1 to 5 the three phases A, B and C are distinguished by utilizing full lines for phase A, dot-and-dash lines for phase B and dotted lines for phase C. The various slots are numbered from 1 to 12 at one end of the motor, and from 1' to 12' at the other end of the motor. In Figs. 1 and 2, the top bars or conductors in the various slots are indicated, with plus and minus signs for indicating whether the current is entering the conductor from the end at which the primed numerals are placed or at the end at which the unprimed numerals are utilized.

Figure 1 shows the top conductors for the small pole-number connection for two poles of the motor, the actual connection being shown in Fig. 3. It will be seen that there are two slots per phase per pole, and it will be further seen that the two slots for each phase, in either pole, are displaced by a distance of three slots with respect to each other, or 90 electrical degrees, for example, the full-line conductors 4'—4 and 7—7' of phase A, forming, at one moment, a south pole having its center between the slots 5 and 6, the 90-degree (three-slot) displacement giving the small distribution-factor of .707, as previously mentioned.

Fig. 2 shows a development of the top conductors in each of the same 12 slots for the higher pole-number connection, these 12 slots corresponding, in this case, to 4 poles of the motor.

It will be noted, from the plus and minus signs indicating the current-entering point and the current-leaving point, respectively, that coils 3, 4, 7, 8, 11 and 12 have been reversed in changing over from the two-pole layout of Fig. 1 to the four-pole layout of Fig. 2. The connection shown in Fig. 2 is the same as that which is achieved in the larger pole-number connection of the winding as arranged previously to my invention.

In both Figs. 1 and 2, I have made no effort to show the coil-sides or conductors which lie in the bottoms of the slots, because these will follow the same sequence of connections as the top coil-sides, only displaced therefrom by a certain number of slots, corresponding to the coil-throw, or pitch, or chording, this number being subject to variation, within certain limits, in order to meet the design-requirements of the motor as to flux-densities, torques, and other factors, which the designer must meet.

Figs. 3 and 4 illustrate, respectively, the double star connection for $2p$ poles and the delta connection for $4p$ poles, and Fig. 5 indicates a simple, 5-pole changeover switch for changing from one pole-number to the other. In these figures, the three terminals or leads for the $4p$ pole-number are indicated at $A_{4p}$, $B_{4p}$, $C_{4p}$, and the three connections for the two $2p$ pole-number are indicated at $A_{2p}$, $B_{2p}$, $C_{2p}$.

In Fig. 6, I have shown a complete wiring diagram for an exemplary embodiment of my invention in a motor having 24 slots per pair of poles in the smaller pole-number, only two poles being shown at this pole-number, it being understood that any additional poles will simply involve a duplication of the winding-portion which I have illustrated. The top coil-sides are indicated by heavy lines, and the bottom coil sides, in the respective slots, are indicated by lighter lines. The directions of current-flow, for the two different pole-number connections, are indicated by arrows, instead of by plus and minus signs as in Figs. 1 and 2, the top arrows indicating the direction of current-flow for two poles at the moment when the current in phase A is a maximum in the positive direction, and the bottom arrows indicating the direction of current-flow for 4 poles.

The winding shown in Fig. 6, having 24 slots per pair of poles at the smaller pole-number, is obviously but a duplication of the 12 slot windings shown in Figs. 1 to 4, the only difference being that each two slots, in Fig. 6, are regarded as being but a single slot as compared with Figs. 1 to 4. This has been indicated in Fig. 6 by numbering the slots successively 1, 1a, 2, 2a, and so on up to 12a.

In Fig. 6, the 5-pole changeover switch, which has already been referred to, receives power from a three-phase line A, B, C. In the upper position of the switch, corresponding to the two-pole connection of the motor-winding, the first three switch-blades supply the power to the motor-terminals $A_{2p}$, $B_{2p}$ and $C_{2p}$, as shown in Fig. 3, while the last two switch-blades make a star-point out of the other three motor-terminals $A_{4p}$, $B_{4p}$ and $C_{4p}$, thus producing the parallel-star connection shown in Fig. 3. The winding is a double-layer three-phase winding lying in 24 slots and connected for 2-pole operation. From the terminal $A_{2p}$ one of the two parallel phase-A circuits may be traced to the top conductor in slot 4a (the top conductor being indicated by the heavy line), thence to the bottom conductor in slot 7a, thence to the top conductor in slot 4a, and finally to the bottom conductor in slot 8, after which an end-connection jumper connects to the next coil-sub-group commencing with the bottom conductor in slot 11. It will thus be noted that the first coil-sub-group is 2 slots wide, the top coil-sides lying in the adjacent slots 4 and 4a. To complete that portion of the winding corresponding to one pole and one phase, it is necessary to trace the conductors through the next coil-sub-group comprising coil-sides lying in the tops of slots 7a and 7 and in the bottoms of slots 11 and 10a, and thence to the star-point $A_{4p}$. It will readily be seen that these two coil-sub-groups are displaced by exactly 6 slots from each other, or 90 electrical degrees, remembering that each pole corresponds to 180 electrical degrees, and that there are 2 poles and 24 slots, making 12 slots for each 180 electrical degrees.

In the lower position of the changeover switch in Fig. 6, 4-pole operation is obtained by a delta connection of the motor-winding, with power supplied to the three motor-terminals $A_{4p}$, $B_{4p}$ and $C_{4p}$, as shown in Fig. 4. The coil sub-groups, such as 4, 4a and 7, 7a, will be the same as before that is, spread over two adjacent slots or two slots wide, and they will be spatially displaced by the same number of slots, or 6 slots, but since there are now four poles, the span of 2 slots corresponds to 60 electrical degrees, and the displacement of 6 slots between successive sub-groups corresponds to 180 electrical degrees or phase-opposition. A complete phase-circuit, however, now includes four of these coil sub-groups in series, such as, from the terminal $A_{4p}$ through the successive sub-groups having top-conductors lying in the slots 7, 7a; 4a, 4; 1, 1a; 10a, 10; to the terminal $C_{4p}$.

Generally speaking, instead of 24 slots, there might have been $s$ slots, and instead of 2 poles and 4 poles there might have been $2p$ and $4p$ poles. The width of each sub-group, instead of being 2 slots, would then be $s/12p$ slots, and the spatial displacement between the sub-groups would be $s/4p$ slots instead of 6 slots.

In the motor-winding shown in Fig. 6, the chording is 7 slots,—thus, for example, from the top of slot 4 to the bottom of slot 7a, giving a two-pole chording of $\frac{7}{12}$ and a two-pole chording-factor $K_c$ of $\cos(\frac{1}{2} \times \frac{5}{12} \times 180°) = .793$, and giving a four-pole chording of $\frac{7}{6}$ and a four-pole chording-factor $K_c$ of $\cos(\frac{1}{2} \times \frac{1}{6} \times 180°) = .966$. The two-pole distribution-factor $K_d$ is $\cos 7\frac{1}{2}° \cos 45° = .701$, where $7\frac{1}{2}°$ is one-half of $15°$, the electrical phase-angle between two adjacent slots, while $45°$ is one-half of $90°$, the electrical phase-angle between the two serially connected coil sub-groups in any circuit per phase per pole. The four-pole distribution-factor $K_d$ is $\cos 15° = .966$, for two serially connected coils (such as coils 4 and 4a) distributed in adjacent slots 30 electrical degrees apart.

The form of embodiment of my invention, as shown in Fig. 6, is essentially the same, in principle, as that which is shown in Figs. 1 to 4. In both instances, it will be observed that the distribution-factor for the lower pole-number is of the order of .71, as distinguished from a distribution factor of the order of .97 in prior-art connections in which the coil-sides of any one phase, corresponding to any one pole, at the smaller pole-number, were disposed in adjacently lying slots, as distinguished from 90-degree or quadrature-related slots, as in my invention.

In accordance with my invention, I thus have an opportunity to make a choice in the matter of the distribution-factor, in changing the pole-number connections, thus supplementing the step of choosing the chording-factor in working out an advantageous motor-design having the same flux-density on either pole-number, or having any other desired ratio of flux-densities at the respective pole-numbers.

While I have disclosed my invention in a preferred form or forms of embodiment, I desire it to be understood that various changes may be made in exact details of connection, such as the total number of slots, the amount of chording, and other factors. I desire, therefore, that the appended claims shall be accorded the broadest construction consistent with their language and the prior art.

I claim as my invention:

1. A pole-changing three-phase winding for a three-phase dynamo-electric machine having in effect, $s$ slots and adapted to operate with either $2p$ poles or $4p$ poles, said winding having a plurality of coil sub-groups, each coil sub-group being, in effect $s/12p$ slots wide, in combination with connection-means for, at times, connecting said coil sub-groups into a $2p$-pole winding having two of said coil sub-groups, which are displaced, in effect, by $s/4p$ slots, connected in series with each other for each pole and each phase, and connection-means for, at other times, reconnecting said coil sub-groups into a $4p$-pole winding having the same coil sub-groups of the respective phases in phase, or phase-opposition, with respect to each other, the $4p$-pole winding being connected with some of the coil sub-groups reversed in comparison with the $2p$-pole connection.

2. A winding according to claim 1, characterized by the fact that the winding is connected in double star for the smaller pole-number and in delta for the larger pole-number.

HANS TRASSL.